United States Patent [19]

Beaber

[11] Patent Number: 5,092,285
[45] Date of Patent: Mar. 3, 1992

[54] DUAL-MODE INDUCTION SYSTEM

[75] Inventor: Wallace E. Beaber, Northville, Mich.

[73] Assignee: Ford Motor Company, Dearborn, Mich.

[21] Appl. No.: 685,312

[22] Filed: Apr. 15, 1991

[51] Int. Cl.[5] .................................. F02M 35/10
[52] U.S. Cl. .................... 123/52 MB; 123/52 MV
[58] Field of Search ......... 123/52 M, 52 MB, 52 MC, 123/52MV, 52 MF, 52 ML, 432

[56] References Cited

U.S. PATENT DOCUMENTS

| | | | |
|---|---|---|---|
| 2,801,620 | 8/1957 | Goodridge . | |
| 2,835,235 | 5/1958 | Gassmann . | |
| 2,894,497 | 7/1959 | Bolles, Jr. . | |
| 2,947,294 | 8/1960 | Bird et al. . | |
| 3,814,069 | 6/1974 | Croft et al. | 123/52 M |
| 3,945,349 | 3/1976 | Elsbett et al. | 123/52 M |
| 4,304,211 | 12/1981 | Tezuka et al. | 123/432 |
| 4,538,556 | 9/1985 | Takeda | 123/52 MB |
| 4,545,331 | 10/1985 | Ito et al. | 123/52 M |
| 4,565,166 | 1/1986 | Takeda | 123/52 M |
| 4,619,226 | 10/1986 | Ueda et al. | 123/52 MB |
| 4,643,138 | 2/1987 | Ruf et al. | 123/52 M |
| 4,646,689 | 3/1987 | Katsumoto et al. | 123/52 MB |
| 4,664,076 | 5/1987 | Miyano et al. | 123/52 MB |
| 4,669,428 | 6/1987 | Ichida et al. | 123/52 MB |
| 4,671,217 | 6/1987 | Hitomi et al. | 123/52 MB |
| 4,679,531 | 7/1987 | Hitomi et al. | 123/52 MB |
| 4,726,329 | 2/1988 | Atkin | 123/52 MB |
| 4,727,829 | 3/1988 | Kondo et al. | 123/52 MB |
| 4,765,285 | 8/1988 | Kobayashi | 123/52 M |
| 4,771,740 | 9/1988 | Koike | 123/52 MB |
| 4,932,369 | 6/1990 | Parr | 123/52 MB |
| 5,018,485 | 5/1991 | Washizu et al. | 123/52 MB |

FOREIGN PATENT DOCUMENTS

| | | | |
|---|---|---|---|
| 0147531 | 8/1985 | Japan | 123/52 MB |
| 0232324 | 10/1986 | Japan | 123/52 M |
| 2031999 | 4/1980 | United Kingdom | 123/52 MB |

Primary Examiner—David A. Okonsky
Attorney, Agent, or Firm—Jerome R. Drouillard; Roger L. May

[57] ABSTRACT

A dual-mode induction system for a multi-cylinder internal; combustion engine wherein an individual intake passage or runner communicates between a common air plenum and each engine cylinder. A separate bypass having an individual port at each engine cylinder extends from the plenum and each internal runner to provide a substantially shorter passage to each engine cylinder and a valve covers each bypass port and is operated in response to engine speed and/or related vehicle operating parameters to simultaneously close the bypasses at low engine speed to force intake air through the longer internal runners and provide a ram tube effect and to simultaneously open the bypasses at high engine speeds to force intake air through the shorter internal runners at a higher frequency and low resistance.

17 Claims, 3 Drawing Sheets

DUAL-MODE INDUCTION SYSTEM

TECHNICAL FIELD

The present invention is directed to a dual-mode induction system for use in an automobile engine.

BACKGROUND ART

Multiple-mode induction systems for automotive engines have been known for some time. Their use has not been popular for a variety of reasons, including high cost, engineering complexity, and overall inefficiency. However, the general concept is that of providing increased torque at low engine speeds and increased power at higher engine speeds. This is usually accomplished by varying the effective length of the air intake manifold or changing its tuning so that the frequency or pulsations of the air column through the manifold matches the frequency with which the intake valve is opening in the engine cylinder. At low speeds, the intake valves open less frequently per unit time and remain open longer per unit time than at higher speeds. Thus, a longer flow pipe or manifold is desirable at low speeds and a shorter flow pipe or manifold at higher speeds. Matching the frequency of air flow to valve opening provides a ram effect or more complete filling of the combustion chamber with air for combustion.

One such system is shown in U.S. Pat. No. 2,894,497 to include a ram tube type manifold for each cylinder wherein the effective length can be infinitely varied over a predetermined range. This maximizes the ram effect of the incoming intake air to the combustion chamber connected with the manifold. In turn, increased volumetric efficiency within the cylinders is obtainable throughout a selected speed range of the engine. Not only is the manifold length adjusted to provide a change in tuning or resonant frequency, but also the intake air feed is maximized because there is direct feed through from the air inlet through the effective length of the manifold.

However, this general type system has not been put into widespread use. Its expense and complexity including its many components and moving parts makes it unsuitable for everyday production vehicles.

Instead, industry has shown most acceptance for simpler dual-mode induction systems wherein the runner type intake manifold has in effect two lengths, i.e. a long runner optimized in length for low speed ranges and a short runner optimized in length for the higher speed ranges. Such systems seem to offer the most advantage concerning relative cost for performance. They generally include a common air inlet to a single air distribution chamber with manifold runners extending therebetween to each respective engine cylinder. Most of these, however, seem to be specifically adapted for in-line engines. Moreover, they provide a change in tuning, and generally do nothing to change the air feed through the system, as shown for example in U.S. Pat. Nos. 4,664,076 to Miyano et al; 4,679,531 to Hitomi; 4,727,829 to Kondo; 4,765,285 to Kobayashi; and 4,771,740 to Koike.

For V-type engines, U.S. Pat. No. 4,669,428 to Ichida discloses a dual-mode intake manifold designed for such use. It provides a dual effective length induction tube having dual resonant frequencies and corresponding dual air feed paths. The change from one effective length to the other is made by opening or closing a butterfly valve located in each respective induction tube. While the operational concept appears to have been reduced to its simplest form, the manner of closing off the long flow path by providing individual control valves in each flow tube is considered undesirable. Further, it will be noted that the intake manifold runners extend generally parallel to the engine longitudinal axis and includes a large plenum in front of the engine generally perpendicular to the crankshaft axis. Such a layout makes it particularly difficult to package or install the system in the ever increasingly popular front-wheel drive vehicle having a transversely mounted engine.

SUMMARY OF THE INVENTION

It is an object of the present invention to provide an improved dual-mode induction system for an internal combustion engine that improves the running of the engine throughout the entire load and speed ranges.

An additional object of the present invention is to provide a dual-mode induction system providing increased torque at lower engine speeds and increased power at high engine speeds by selection of one of two tuned lengths of inlet pipe.

Yet another object of the present invention is to provide a dual-mode induction system wherein the effective length of the induction tubes may be controlled by a simply constructed plenum and cooperating flapper valve adapted to establish a shorter effective flow path at a plurality of induction tubes at the same time.

A further object of the present invention is to provide an improved dual-mode induction system for an internal combustion engine which has a low silhouette to easily be mounted on an overhead valve V-type engine having a pair of cylinder heads oriented on opposite sides of an engine axis.

A still further object of the present invention is to provide a dual-mode induction system which is easily mounted to existing overhead valve V-type engines having a pair of cylinder heads oriented at opposite sides of an engine axis, without requiring major modification of existing engines or components, or the hood line or vehicle silhouette.

It is another object of the present invention to provide the dual-mode induction system that is easily manufactured and assembled from an inventory of preformed components.

Another object of the present invention is to provide easy access and removal of the dual-mode induction system for repair and maintenance without requiring major engine dismantling.

In a preferred embodiment, this invention provides a dual-mode induction system for a multicylinder internal combustion engine having at least one air intake port to each cylinder for allowing air to cylinder for purposes of combustion. The system further includes a manifold having an elongated plenum forming a cavity and a mounting surface for attachment to the engine. The manifold has an inlet air duct communicating with said plenum and a plurality of runners corresponding to and coupled respectively to each of the intake ports. Each of the runners forms a loop of predetermined length defining a long flow path between the plenum and its respective intake port. The plenum includes a wall portion and a plurality of bypass ports located in line along the wall portion. A bypass member extends and provides communication between a respective one of the bypass ports and each of the runners intermediate the intake port. The bypass member defines a flow path shorter than the predetermined length of the long flow path. A valve means regulates the flow of air through each bypass to vary the effective length of the runners to maximize engine output at various engine speed conditions and also includes a single valve member adapted to overlay and thereby close at least a pair of the bypass ports.

Further, the present invention provides a dual-mode induction system for an overhead valve V-type engine having a pair of cylinder heads oriented on opposite sides of the engine axis, each of the cylinder heads having a plurality of intake ports. A manifold is generally centrally located about the midline of the engine. The manifold has an elongated plenum forming a cavity generally parallel to and overlaying one of the cylinder heads and a mounting surface for connecting the manifold to a pair of cylinder heads. The manifold has an inlet port located toward the midline of the engine and oriented such that the runners are equally distributed about the inlet port. The manifold communicates with the plenum and a plurality of runners which correspond to and are coupled with a respective number of intake ports. The runners are generally horizontal and extend outwardly at the point of attachment to the plenum. Each of the runners extends transversely to the engine axis over one of the cylinder heads. Each of the runners form a loop of predetermined length overlaying one of the cylinder heads and are generally horizontal at the point of communicating with the elongated plenum. Each runner provides a long flow path of equal length connecting the plenum to the respective intake ports. A plurality of bypasses extend between the plenum and each of the runners intermediate the intake port to define a flow path shorter than the predetermined length of the long flow path. Air flow through each of the bypasses is regulated by a valve to vary the effective length of the runners to maximize engine output at various engine speed conditions.

The invention, together with additional features, objects, and advantages thereof, may best be understood by reference to the following description when taken in connection with the accompanying illustrative drawings.

BEST MODE FOR CARRYING OUT THE INVENTION

The embodiment illustrated in FIGS. 1 through 4 shows a dual-mode induction manifolding system 10 for mounting or attaching to an eight cylinder overhead V-type internal combustion engine 12.

Figure 1:
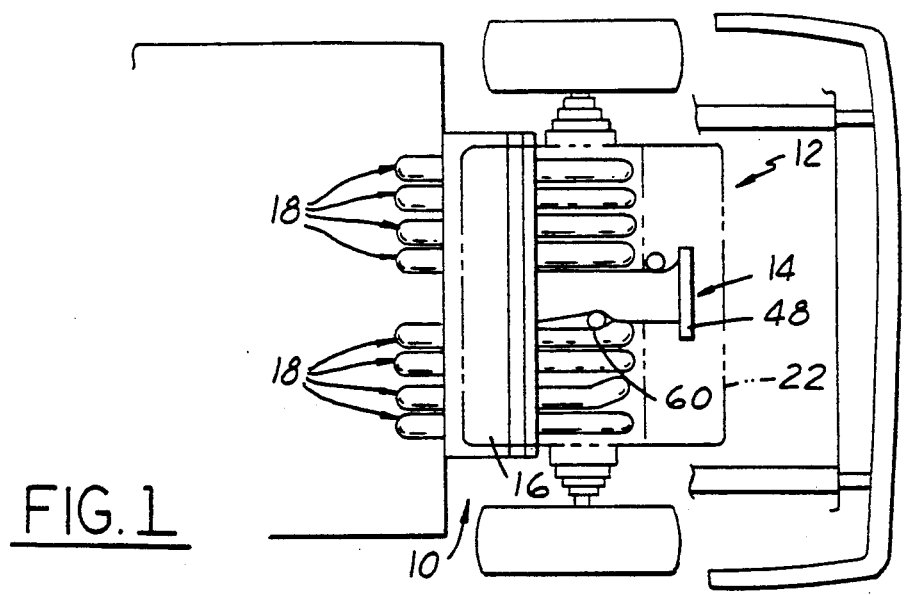
FIG. 1 is an overhead view of the dual-mode induction system mounted on an overhead valve V-type internal combustion engine in accordance with the present invention.
Figure 2:
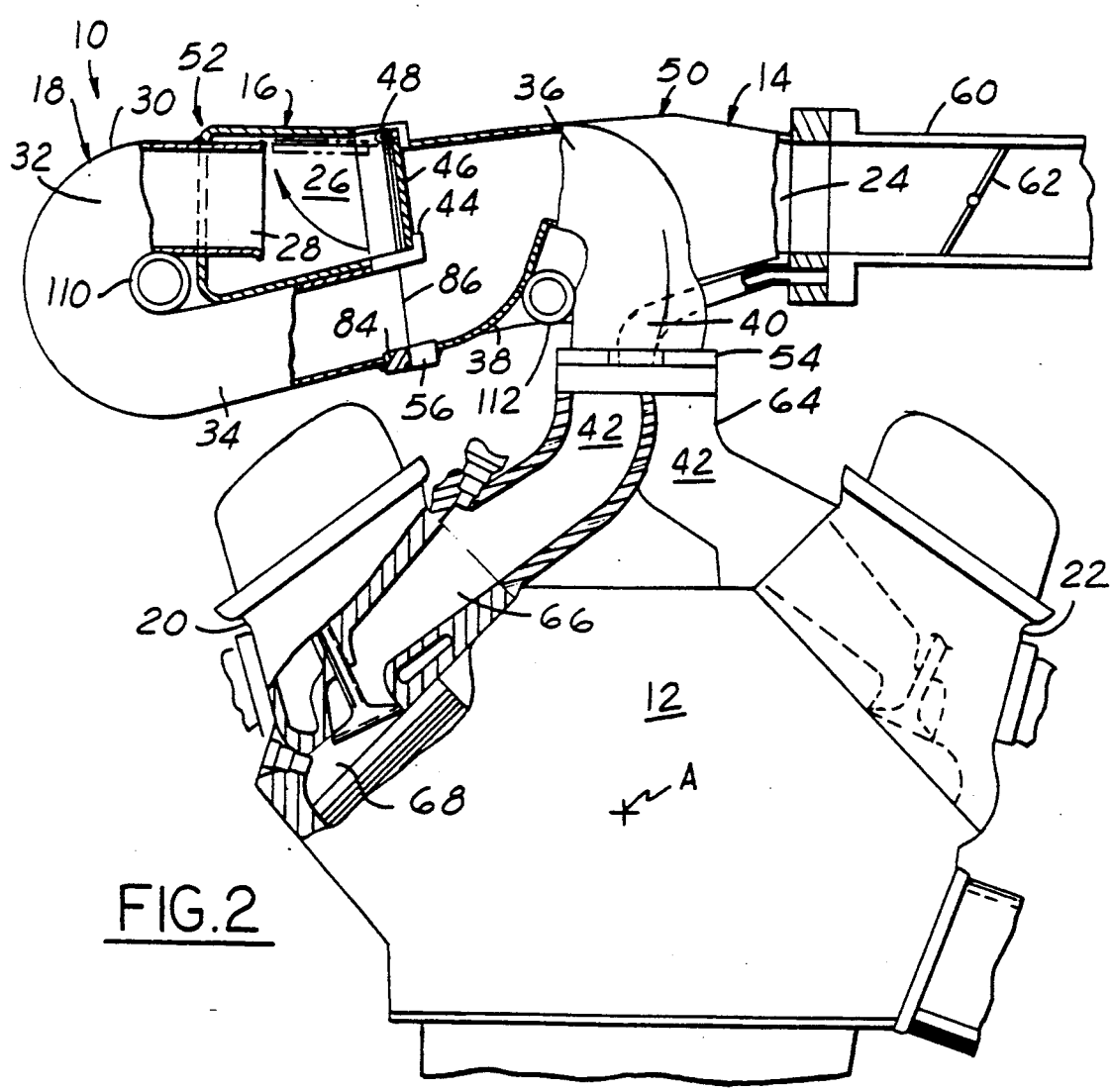
FIG. 2 is a side view of the dual-mode induction system to FIG. 1.

The manifold 10 is generally longitudinal in shape and is mounted generally at about the midline of the engine 12 as represented by axis A shown in FIG. 2.

The manifold basically comprises an inlet air duct 14, a plenum member 16 and a plurality of runners 18, one each for each cylinder of the engine 12.

The plenum member 16 is an elongate member disposed horizontally directly over a single cylinder head 20. The inlet air duct 14 extends transversely of the plenum member 16 in the direction of the other cylinder head 22 and terminates at a point directly above the cylinder head 22.

The inlet air duct 14 is substantially horizontal to the top of the engine 12 to present the lowest possible profile, and the inlet passage 24 is in constant open communication with the plenum or cavity 26 of the plenum member 16.

The runners 18 provide a long flow path of predetermined length for the intake air. Each runner 18 is constructed basically identically so that a description of one is a description of all. As seen best in FIG. 2, the runners 18 begin at an inlet end 28 disposed in the plenum 26 opposite the point at which the inlet air duct 14 discharges air into the plenum 26. The runner 18 at this point comprises a first section 30 which is generally C-shaped to form a loop extending first downward along a leg 32 and then inward along a leg 34 horizontally across the bottom of the plenum member 16 to a point generally at the inlet air duct 14 side of the plenum 26. From there, the runner 18 comprises a second section 36 which again is generally C-shaped and which extends upwardly along a leg 38 to the height of the inlet air duct 14 and the downward along a leg 40 to a point midway between the cylinder heads 20 and 22, and in open communication with the intake port runners 42 of the engine 12 as described in detail below. On the same side of the plenum 26 as is disposed the second section 36 of each of the runners 18, there is provided a bypass inlet 44 leading directly to the second section 36 of each of the runners 18. A valve member 46 in the general form of a flat plate mounted on a shaft 48 acting as a hinge is provided at the bypass inlet 44 to allow closing off the bypass inlet 44, as shown in solid line, or opening the bypass inlet 44, as shown in phantom line. The valve member 46 can be likened to a cooking pot cover or the type of valve one finds on a saxophone. It is a simple cover.

As explained in greater detail below, with the bypass inlet 44 closed, intake air is forced through the longest flow path of the runners 18, namely through both runner sections 30 and 36. This provides optimum power at low speeds. With the bypass inlet 44 open, the intake air is allowed to bypass completely the first section 30 and to pass from the plenum 26 directly into the second section 36 of the runners 18 which provide optimum performance at higher speeds.

Figure 3:
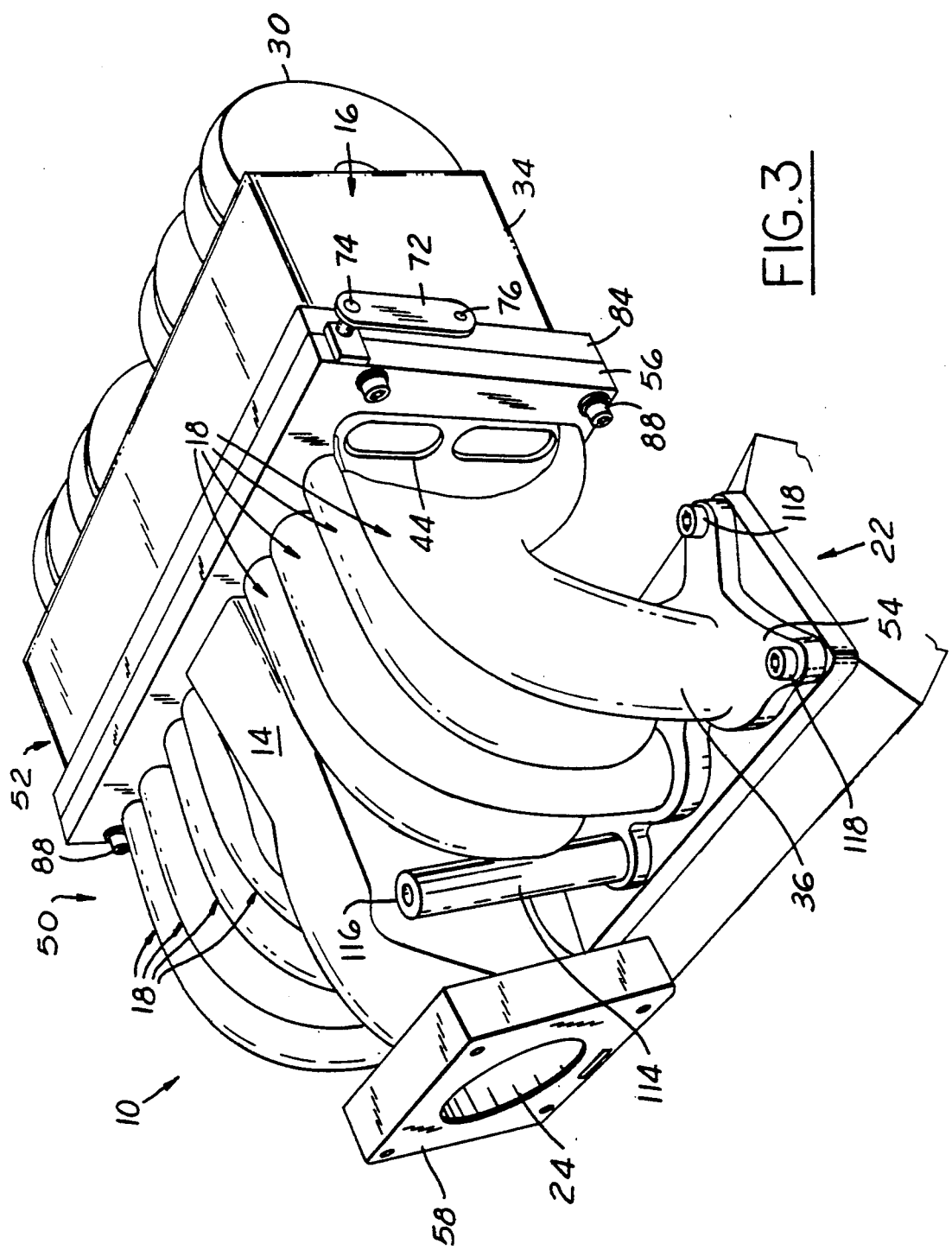
FIG. 3 is a perspective view, shown partly in section, of the dual-mode induction system shown in FIG. 1.
Figure 4:
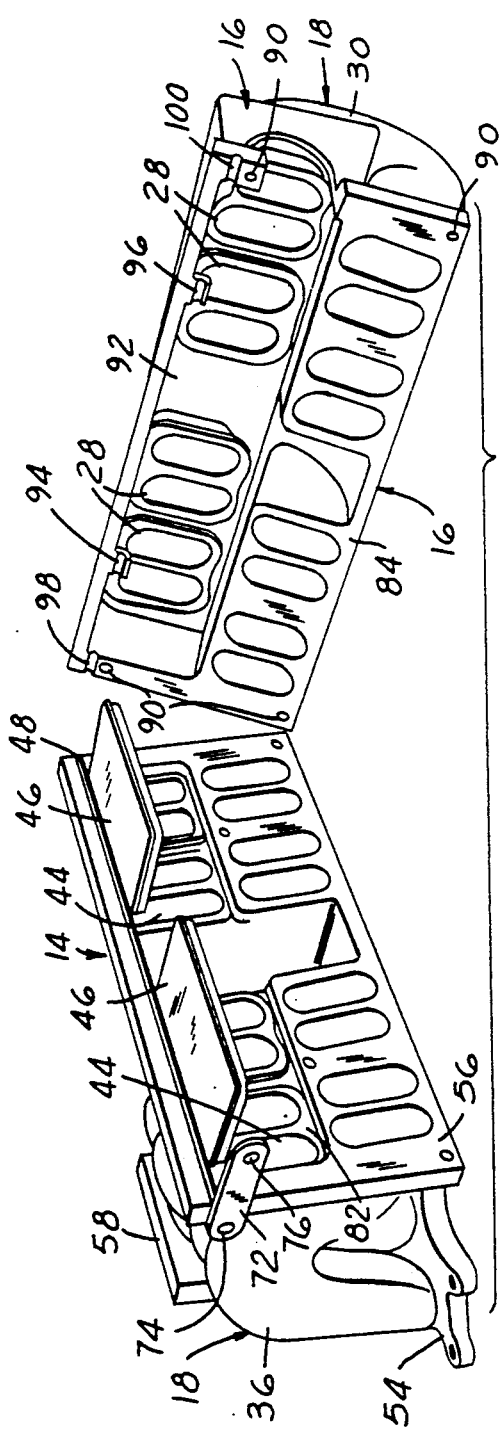
FIG. 4 is an exploded view of the manifold shown in FIG. 3 showing the internal porting of the induction system.

Looking at FIGS. 2–4, and particularly FIG. 4, it will be noted the manifold 10 is constructed of two main sections 50 and 52.

The first section 50 is primarily located in the area above of the engine 12 between the cylinder heads 20 and 22. The first section 50 consists of the inlet air duct 14, port runners 36 between flange 56 and flange 54, plus valve 46. The second section 52 of the runners 18 (one for each cylinder of the engine), starts at plenum 16 and terminates in an integral common mounting flange 84 and a face plate 56 at the inlet end of the second section 36 of the runners 18.

The inlet air duct 14 has a radially enlarged attachment plate 58 to which is connected an air or air-fuel mixture inlet pipe 60 within which is located a throttle valve 62. The external shape of the inlet air duct 14 is generally rectangular and is in parallel alignment with the runners 18. As shown in FIG. 3, the internal end of the inlet port 24 at the first face plate 58, is generally rectangular in shape extending from the bottom to the top of the first face plate 56. The location of the inlet air duct 14 is such that it divides the runners 18 equally to assure the most efficient overall distribution of air through the manifold 10.

As previously described, the portions of the runners 18 affixed to this first manifold section 50 constitute the second section 36 or discharge the end of the runners 18. The runners 18 terminate at the mounting flange 54 at a location of communication with the intake ports 32 within a mounting member 64 which, in turn, is in open communication with the respective intake ports 66 of each combustion chamber 68 in each cylinder head 20 and 22, respectively.

An open groove is situated along the upper peripheral edge of the first face plate 56 into which the shaft 48 is seated allowing rotational movement along the shaft's longitudinal axis. An arm 72 is affixed to the distal end of the shaft 48 to control its rotational movement. The shaft 48 is affixed to the arm 72 by means of force fitting into an opening 74 located at the distal end of the arm 72 and then being fastened thereto. A similar opening 76 is located at the opposite distal end of arm 72 to receive a shaft or other control element (not shown) to control the opening and closing of two valves 46.

The valves 46 are generally rectangular plates located within the upper portion of the first face plate 56. The valves 46 are affixed by welding or similar fastening means at their upper end to the shaft 48 to enable an opening and closing of the valves 46 by rotational movement of the shaft 48 in response to engine speed. The valves 46 are situated on either side of the discharge end of the inlet air duct 14 into plenum 26, such that each valve controls air flow through more than one bypass inlet 44.

In the closed position, the valves 46 are located in a recessed area 82 within the first face plate 56 to ensure proper closing of the bypass inlet 44 and to enable the opening of the valves 46 at relatively higher engine speed.

The second manifold section 52 of the dual-mode induction system 10 is in horizontal alignment with the first section 50 and is located above the cylinder head 20. The second manifold section 52 consists of a second face plate 84, the plenum member 16, and the leading or first section 30 of the runners 18.

The second face plate 84 is a mirror image of the first face plate 56 without the valves 46 and the internal discharge end of the inlet passage 24. Specifically, the face plates 56 and 84 respectively are connected in air tight fashion at the interface 86 by means of bolts 88 or other conventional fastening means shown representatively at the outer edges of the face plates 56 and 84 which securingly mate with cooperating openings 90 in the second face plate 84.

A recessed area 92 in the second manifold section 52 extends into the bottom portion of the second face plate 84 to match the enlarged discharge end of the inlet passage 24. When the first and second face plates 56 and 84 are joined, the recess areas 82 and 92 complete the plenum 26. The plenum 26 is an elongated cavity which, in this embodiment, is generally rectangular extending the length of the manifold 10.

Grooved supports 94 and 96 and grooves 98 and 100 in the upper peripheral edge of the second face plate 84 cooperate with the similarly aligned groove in the first face plate 56 to securely hold the shaft 48 while allowing rotational movement.

A mounting sleeve 110 is located between the first section 30 of the runners 18 and the plenum 26 and affixed to runners 18. An additional mounting sleeve 112 is affixed to the inlet air duct 14 within the loop portion of the second section 36 of the runners 18. Each mounting sleeve 110,112 extends generally parallel to the engine axis A and provides a means for supporting the one end of the manifold 10 from, as well as fixing it to, the engine 12. Additional vertically disposed mounting sleeves such as mounting sleeve 114 may be provided adjacent the inlet air duct 14 to fasten the manifold 10 to the engine 12. The mounting sleeve 114 is affixed at one end to the mounting flange 54 and has a free end 116 to receive a bolt (not shown) or the like. Additionally, a series of mounting bolts 118 are provided to secure the manifold 10 to the engine 12 at the mounting plate 54.

In operation, air is introduced through the throttle valve 62 into the manifold 10 via the inlet passage 24. Air from the inlet passage 24 is deposited into the plenum 26 where, depending on the engine speed, the valves 46 as a valve unit, will be open or closed.

Although not forming a part of the present invention, it is preferred that an automatic electronic control (not shown) is provided for sensing a predetermined engine speed demand and actuating shaft 48 via the arm 72 in response to that demand to open or close the valves 46.

At low engine speeds, the valves 46 are closed forcing the air through the first section 30 of the runners 18, then to the second section 36 of the runners 18, and finally to the engine 10 via the cooperating intake ports 42 and 66, defining the long flow path. At high engine speeds, valves 46 are open allowing the air to avoid the first section 30 of the runners 18 and directly enter into the bypass inlet 44 and then into second section 36 of the runners 18 and then to the engine 12 through the intake ports 42 and 66, defining the short flow path. When the valves 46 are open at high engine speeds, increased pressure drop across the bypass inlet 44 as opposed to the higher pressures at the inlet ends 28 of the first section 30 of the runners 18 cause the air to flow through the short flow path rather than the long flow path.

Figure 5:
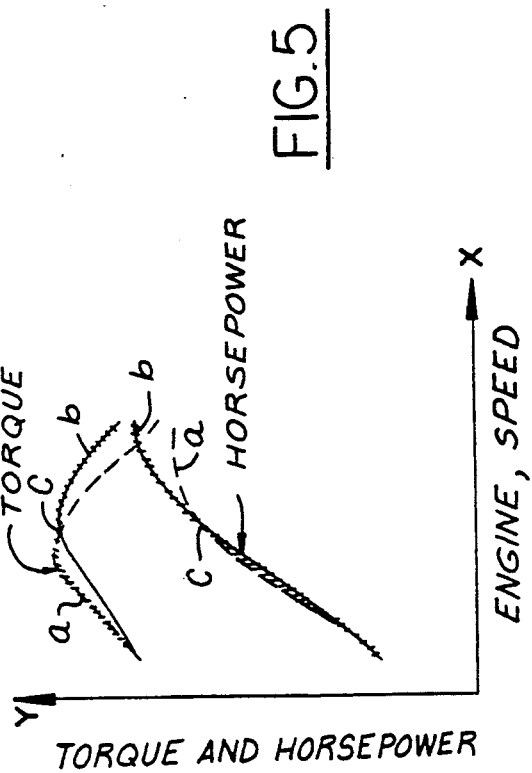
FIG. 5 is a graph showing the relative ratio of torque to engine speed illustrating the effect of the long flow path and the short flow path respectively.

As shown in the chart in FIG. 5, the horse power and torque of the engine are significantly improved at higher engine speed when the valves 46 are open defining the short flow path, thereby improving engine performance.

The horsepower and torque curves designated a represent engine performance using the long flow path intake manifold, i.e. with the valves 46 remaining closed. The horsepower and torque curves designated b represent engine performance using the short flow path intake manifold, i.e. with valves 46 open. Point c is the ideal transition point at which one would prefer to open the valves 46 to sustain the engine's higher torque and horsepower output. The composite performance curve is represented as a single shaded performance curve.

While the best mode for carrying out the invention has been described in detail, those familiar with the art to which this invention relates will recognize various alternative designs and embodiments for practicing the invention as defined by the following claims.

I claim:

1. A dual-mode induction system for a multi-cylinder internal combustion engine having at least one intake port to each cylinder for allowing air to each cylinder for purposes of combustion, said system comprising:

a manifold having an elongated plenum forming a cavity and a mounting surface for attachment to the engine, said manifold having an inlet air duct communicating with said plenum and a plurality of runners corresponding to and coupled respectively to each of the intake ports, each of said runners forming a loop of predetermined length and communicating with said elongated plenum, each of said runners defining a long flow path between said plenum and its respective intake port, said plenum including a wall portion and a plurality of bypass ports located in line along said wall portion, a bypass member extending and providing communication between a respective one of said bypass ports and each of said runners intermediate said intake port, said bypass member defining a flow path shorter than the predetermined length of said long flow path; and valve means for regulating the flow of air through each said bypass port to vary the effective length of said runners to maximize engine output at various engine speed conditions, said valve means including a single valve member adapted to overlay and thereby close at least a pair of said bypass ports.

2. The dual-mode induction system of claim 1 wherein said valve means further comprises a single pivotal control shaft extending the length of said plenum and a plurality of said valve members being affixed thereto for opening and closing said bypass ports.

3. The dual-mode induction system of claim 2 wherein said valve means comprises a valve in the form of a flat plate operable solely within the plenum and adapted to be pivoted from a closed position obstructing a respective pair of said bypass ports to an open position permitting open communication of said pair of bypass ports with the plenum.

4. A dual-mode induction system for an overhead valve V-type engine having a pair of cylinder heads oriented on opposite sides of an engine axis, each of said heads having a plurality of intake ports, said system comprising:

a manifold having an elongated plenum forming a cavity generally parallel to and overlaying one of said cylinder heads and a mounting surface for attachment to the pair of cylinder heads, said manifold having an inlet port communicating with said plenum and a plurality of runners corresponding to and coupled respectively to each of the intake ports, each of said runners extending transversely to the engine axis over one of said cylinder heads, each of said runners forming a loop of predetermined length overlaying one of said cylinder heads and communicating with said elongated plenum, each of said runners defining a long flow path between said plenum and its respective intake port, a bypass extending between said plenum and each of said runners intermediate said intake port, said bypass defining a flow path shorter than the predetermined length of said long flow path; and valve means for regulating the flow of air through each said bypass to vary the effective length of said runners to maximize engine output at various engine speed conditions.

5. The dual-mode induction system of claim 4 further comprising a throttle valve cooperating with said plenum inlet duct for regulating air flow.

6. The dual-mode induction system of claim 4 wherein said inlet air duct extends substantially horizontally from said plenum.

7. The dual-mode induction system of claim 6 wherein said inlet air duct horizontally extends above the engine.

8. The inlet air duct of claim 6 wherein said inlet air duct is situated toward the midline of the engine so as to be generally centrally located over said engine.

9. The dual-mode induction system of claim 4 wherein said manifold is comprised of two elongated adjoining sections extending the approximate length of the engine parallel to the engine axis, said plenum being formed at the interface of said two manifold sections to define an elongate plenum extending approximately the length of the engine and being substantially parallel to the engine axis;

one said manifold section being adapted to be positioned directly above the engine axis laterally midway of the engine cylinder heads and said inlet port being affixed to said one manifold section an in open communication with said plenum, the other of said manifold sections being disposed directly above one of the cylinder heads;

each said runner having a first section affixed to said other manifold section, including an inlet end beginning at said plenum and terminating at the interface of said two manifold sections;

each said runner having a second section affixed to said one manifold section beginning at said interface and terminating at said intake port;

said bypass including a plurality of bypass ports within said plenum with a single bypass port being in open communication with a respective one of said runners at said second section thereof;

said valve means being operable to fully close said bypass ports to force intake air from the plenum through both sections of each runner throughout the predetermined length of the long flow path and to open said bypass ports to allow intake air to flow directly from the plenum through said second runner sections only whereby a short flow path of predetermined length is established to each intake port for each engine cylinder.

10. The dual-mode induction system of claim 9 wherein said valve means comprises a single pivotal control shaft extending the length of said plenum and a plurality of valves affixed thereto for opening and closing said bypass.

11. The dual-mode induction system of claim 10 wherein each of said valves comprise a flat plate operable solely within the plenum and adapted to be pivoted from a closed position covering a bypass to an open position permitting open communication of the bypass with the plenum.

12. The dual-mode induction system of claim 11 wherein said pivotal shaft is located at the interface between said two manifold sections.

13. The dual-mode induction system of claim 11 wherein one said valve is provided on each side of said inlet air duct, said valves simultaneously controlling the air flow through all runners.

14. The dual-mode induction system of claim 4 wherein said inlet air duct is located toward the midline of said engine and said inlet air duct is situated on said manifold such that said runners are equally distributed about said inlet air duct.

15. The dual-mode induction system of claim 4 wherein said runners are generally horizontal and extend outwardly at the point of attachment with said plenum.

16. The dual-mode induction system of claim 15 wherein said inlet air duct is located toward the midline of said engine and said inlet port is situated on said manifold such that said runners are equally distributed about said inlet air duct.

17. A dual-mode induction system for an overhead valve V-type engine having a pair of cylinder heads oriented on opposite sides of an engine axis, each of said heads having a plurality of intake ports, said system comprising:

a manifold generally centrally located about the midline of said engine having an elongated plenum forming a cavity generally parallel to and overlaying one of said cylinder heads and a mounting surface for attachment to the pair of cylinder heads, said manifold having an inlet port situated on said manifold toward the midline of said engine, oriented such that said runners are equally distributed about said inlet port and communicating with said plenum, and a plurality of runners corresponding to and coupled respectively to each of the intake ports, locally said runners are generally horizontal and extend outwardly at the point of attachment with said plenum, each of said runners extending transversely to the engine axis over one of said cylinder heads, each of said runners forming a loop of predetermined length overlaying one of said cylinder heads and being generally horizontal at the point of communicating with said elongated plenum, each of said runners defining a long flow path between said plenum and its respective intake port, a plurality of bypasses extending between said plenum and each of said runners intermediate said intake port, each said bypass defining a flow path of equal length relative to one another and shorter than the predetermined length of said long flow path; and valve means for regulating the flow of air through each said bypass to vary the effective length of said runners to maximize engine output at various engine speed conditions.

* * * * *